United States Patent
Haase et al.

(10) Patent No.: US 10,090,535 B2
(45) Date of Patent: Oct. 2, 2018

(54) FUEL CELL HAVING AT LEAST ONE ACTIVE SURFACE LAYER

(71) Applicant: Bayerische Motoren Werke Aktiengesellschaft, Munich (DE)

(72) Inventors: Stefan Haase, Munich (DE); Andreas Buchner, Steinebach (DE); Michael Bauer, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 415 days.

(21) Appl. No.: 14/792,340

(22) Filed: Jul. 6, 2015

(65) Prior Publication Data

US 2015/0325876 A1 Nov. 12, 2015

Related U.S. Application Data

(63) Continuation of application No. PCT/EP2013/075766, filed on Dec. 6, 2013.

(30) Foreign Application Priority Data

Jan. 7, 2013 (DE) .................. 10 2013 200 112

(51) Int. Cl.
*H01M 8/04* (2016.01)
*H01M 8/24* (2016.01)
(Continued)

(52) U.S. Cl.
CPC ....... *H01M 8/0258* (2013.01); *B60L 11/1898* (2013.01); *H01M 8/0263* (2013.01);
(Continued)

(58) Field of Classification Search
CPC ............ H01M 8/02; H01M 8/04; H01M 8/24; H01M 8/0258; H01M 8/0489; H01M 8/2485
See application file for complete search history.

(56) References Cited

U.S. PATENT DOCUMENTS

3,994,748 A * 11/1976 Kunz .................. H01M 8/00
                                                           429/458
6,720,101 B1    4/2004 Dong et al.
(Continued)

FOREIGN PATENT DOCUMENTS

| CN | 101124686 A | 2/2008 |
|----|-------------|--------|
| CN | 101983451 A | 3/2011 |
| CN | 102117922 A | 7/2011 |

OTHER PUBLICATIONS

Chinese Office Action issued in Chinese counterpart application No. 201380065708.9 dated May 4, 2017, with partial English translation (Ten (10) pages).
(Continued)

*Primary Examiner* — Kenneth J Douyette
(74) *Attorney, Agent, or Firm* — Crowell & Moring LLP (57) ABSTRACT

The invention relates to a fuel cell having an anode/cathode stack, which comprises at least one active surface layer, which is designed having a first channel structure having a plurality of first channels for conducting a first fluid in a first direction over the surface layer, which is designed having a second channel structure having a plurality of second channels for conducting a second fluid in a second direction over the surface layer, wherein the second direction extends substantially perpendicularly to the first direction, which is designed having a first feeding structure for feeding the first fluid into the plurality of first channels, and which is designed having a second feeding structure for feeding the second fluid into the plurality of second channels. According to the invention, the first feeding structure and the second feeding structure are both arranged on a first edge of the surface layer and the first feeding structure additionally
(Continued)

comprises an edge channel for feeding the first fluid to a second edge of the surface layer that is directed perpendicular to the first edge.

16 Claims, 7 Drawing Sheets

(51) Int. Cl.
*H01M 8/0258* (2016.01)
*H01M 8/04089* (2016.01)
*B60L 11/18* (2006.01)
*H01M 8/2483* (2016.01)
*H01M 8/241* (2016.01)
*H01M 8/0263* (2016.01)
*H01M 8/0267* (2016.01)
*H01M 8/1018* (2016.01)

(52) U.S. Cl.
CPC ..... *H01M 8/0267* (2013.01); *H01M 8/04089* (2013.01); *H01M 8/241* (2013.01); *H01M 8/2483* (2016.02); *H01M 8/2415* (2013.01); *H01M 2008/1095* (2013.01); *H01M 2250/20* (2013.01); *H01M 2300/0082* (2013.01); *Y02T 90/32* (2013.01)

(56) References Cited

U.S. PATENT DOCUMENTS

| | | | |
|---|---|---|---|
| 2002/0172852 | A1 | 11/2002 | Frank et al. |
| 2002/0192531 | A1* | 12/2002 | Zimmerman ........... F28D 9/005 |
| | | | 429/492 |
| 2003/0207165 | A1* | 11/2003 | Skala ................ H01M 8/04089 |
| | | | 429/444 |
| 2004/0048141 | A1 | 3/2004 | Blank et al. |
| 2004/0101738 | A1 | 5/2004 | Tawfik et al. |
| 2004/0191606 | A1 | 9/2004 | Lee et al. |
| 2004/0224205 | A1* | 11/2004 | Marianowski ...... H01M 8/0206 |
| | | | 429/435 |
| 2005/0221154 | A1 | 10/2005 | Guthrie |
| 2007/0231666 | A1 | 10/2007 | Wang et al. |
| 2010/0104922 | A1 | 4/2010 | Mattejat et al. |
| 2011/0070519 | A1 | 3/2011 | Lee et al. |

OTHER PUBLICATIONS

Chinese Office Action issued in Chinese counterpart application No. 201380065708.9 dated Sep. 5, 2016, with English translation (Fourteen (14) pages).
International Search Report dated Feb. 6, 2014 (Three (3) pages).
German Search Report dated Jul. 22, 2013, with Statement of Relevancy (Six (6) pages).

* cited by examiner

FUEL CELL HAVING AT LEAST ONE ACTIVE SURFACE LAYER

CROSS REFERENCE TO RELATED APPLICATIONS

This application is a continuation of PCT International Application No. PCT/EP2013/075766, filed Dec. 6, 2013, which claims priority under 35 U.S.C. § 119 from German Patent Application No. 10 2013 200 112.6, filed Jan. 7, 2013, the entire disclosures of which are herein expressly incorporated by reference.

BACKGROUND AND SUMMARY OF THE INVENTION

The invention relates to a fuel cell with an anode-cathode stack, which comprises at least one surface layer, which fuel cell is designed with a first channel structure having a multiplicity of first channels for conducting a first fluid in a first direction over the surface layer, which fuel cell is designed with a second channel structure having a multiplicity of second channels for conducting a second fluid in a second direction over the surface layer, wherein the second direction extends in the main transversely to the first direction, which fuel cell is designed with a first feed structure for feeding the first fluid into the multiplicity of first channels, and which fuel cell is designed with a second feed structure for feeding the second fluid into the multiplicity of second channels. The invention also relates to a use of such a fuel cell on a motor vehicle.

Fuel cells of the type according to the invention are designed especially as a polymer electrolyte fuel cell (PEFC), or a proton exchange membrane fuel cell (PEMFC) with an anode-cathode stack (bipolar plate stack) which comprises a multiplicity of active surface layers. The individual surface layer is designed with an anode and a cathode which are separated by a membrane. So that proton transport can take place in the membrane, hydrogen (in the form of gas) and oxygen (in the form of air) and also, if necessary, a coolant (in the form of liquid water) have to be fed into the surface layer as reaction fluids.

To this end, the individual surface layer is designed with a first channel structure for conducting a first fluid over the surface layer and a first feed structure for feeding the first reaction fluid into the first channel structure. Also, provision is made on the surface layer for a second channel structure for conducting the second fluid over the surface layer and a second feed structure for feeding the second fluid into the second channel structure. The individual channel structures are designed in each case with a multiplicity of channels lying next to each other and in this way extend over the entire surface of the surface layer. The feed structures are located on the edges of the surface layer and serve for introducing the respective fluid into the multiplicity of associated channels as uniformly as possible. The feed structures can be integrated as a so-called internal manifold in a plate representing the feed structure. Alternatively, the feed structures can be designed as so-called external manifolds. In the case of this design, the feed structures are connected on the outside to the anode-cathode stack as separate components.

For cost and weight reasons, this type of external manifold is to be preferred. With regard to the sealing of an interface which then results between the external manifold and the anode-cathode stack such designs are not without problems, however. This is especially the case if for feeding the first and second fluids channel structures which extend transversely to each other, so-called cross-flow fields, are to be used. For such structures, it is necessary in particular to arrange manifolds on three to four edges of the surface layers which in this case are rectangular.

Created according to the invention is a fuel cell with an anode-cathode stack, which comprises at least one active surface layer which is designed with a first channel structure having a multiplicity of first channels for conducting a first fluid in a first direction over the surface layer, which fuel cell is designed with a second channel structure having a multiplicity of second channels for conducting a second fluid in a second direction over the surface layer, wherein the second direction extends in the main transversely to the first direction, which fuel cell is designed with a first feed structure for feeding the first fluid into the multiplicity of first channels, and which fuel cell is designed with a second feed structure for feeding the second fluid into the multiplicity of second channels. According to the invention, the first feed structure and the second feed structure are both arranged on a first edge of the surface layer and the first feed structure additionally has an edge channel for feeding the first fluid to a second edge of the surface layer which is oriented transversely to the first edge.

With the design according to the invention, it is possible to realize a cross-flow field which manages with only two external manifolds. The costs and complexity of the solution according to the invention are comparatively correspondingly low.

To this end, according to the invention both fluids are fed on one edge of the respective surface layer and then one of the fluids is conducted by means of an edge channel, transversely to this first edge, along a second edge of the surface layer. This type of lateral diversion of the first fluid to a second edge of the surface layer according to the invention is preferably carried out with the hydrogen reaction gas. Hydrogen has a low viscosity so that a diversion is possible even in a small installation space. In this case, an installation space, provided anyway on the surface layer, beneath a seal can be used for the edge channel. Also, a saving can be made on installation space for otherwise necessary manifolds on the other edges of the stack. The overall volume of the anode-cathode stack according to the invention can therefore turn out to be smaller than in the case of conventional stacks. Furthermore, the aforesaid sealing problems are particularly small in the case of the solution according to the invention.

In an advantageous embodiment of such a fuel cell according to the invention, the surface layer is of rectangular design, wherein the first edge is then a first longitudinal side of this rectangular shape and the second edge is a second longitudinal side of the rectangular shape which is adjacent to the first longitudinal side.

The edge channel for feeding the first fluid preferably extends along the entire second edge of the surface layer. With an edge channel of such length, the first fluid can be diverted across the entire second edge into channels of an associated channel structure which begin there.

In this case, a further edge channel is then also formed, preferably on a third edge of the surface layer opposite the second edge, for discharging the first fluid from the multiplicity of first channels along the entire third edge of the surface layer. In this way, a Z-shape is formed, in which the first fluid is fed on one side of the anode-cathode stack, then conducted through the stack transversely to the previous direction, and then in turn discharged on the other side transversely to the previous direction.

Alternatively, the edge channel for feeding the first fluid extends along only a part of the second edge, the first channels are designed in the associated surface layer in an S-shaped extending manner, and on a third edge of the surface layer opposite the second edge a further edge channel for discharging the first fluid from the multiplicity of first channels extends along only a part of the entire third edge. With this constructional form, the available installation space can be utilized in a particularly efficient way.

The second feed structure, in the case of the fuel cell according to the invention, is preferably designed with a second feed channel, extending perpendicularly to the surface layer, for feeding the second fluid and is arranged on the first edge in its corner region facing away from the second edge. In this case, the second fluid, which is preferably air, is conducted across the surface layer especially obliquely to the first and second directions or in an S-shaped manner. In the case of the S-shaped channel routing, the second fluid is first of all conducted in the first direction, then in the second direction and then again in the first direction over the surface layer.

The first feed structure is preferably designed with a first feed channel, extending perpendicularly to the surface layer, for feeding the first fluid and is arranged on the first edge in its corner region to the second edge. The feed and discharge of the first fluid are therefore preferably arranged on two diametrically opposite corners of the anode-cathode stack, which are then located especially laterally next to a central feed or discharge of a third fluid on the first edge, as is explained in more detail below.

Furthermore, provision is preferably made on the fuel cell according to the invention for a third channel structure which is designed with a multiplicity of third channels for conducting a third fluid in a third direction over the surface layer and with a third feed structure for feeding the third fluid into the multiplicity of third channels. In this case, the third feed structure is also arranged on the first edge. With such a third channel structure, the third fluid, which is preferably a coolant, can be conducted especially obliquely to the first and second directions or in an S-shaped manner across the surface layer. In the case of the S-shaped channel routing, the third fluid is first of all conducted in the first direction, then in the second direction, and then again in the first direction across the surface layer.

In this case, the third feed structure is preferably designed with a third feed channel, extending perpendicularly to the surface layer, for feeding the third fluid and is arranged on the first edge in its middle region. The third feed channel is located on the third edge, that is to say especially between the first and the second feed channels. A central, middle feed of the third fluid into the third channels, which in this case extend especially in parallel next to each other across the surface layer, is possible in this way.

The invention is finally also specifically directed towards the use of such a fuel cell according to the invention on a motor vehicle, especially a hybrid vehicle.

Exemplary embodiments of the solution according to the invention are explained in more detail below with reference to the attached schematic drawings. In the drawing:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
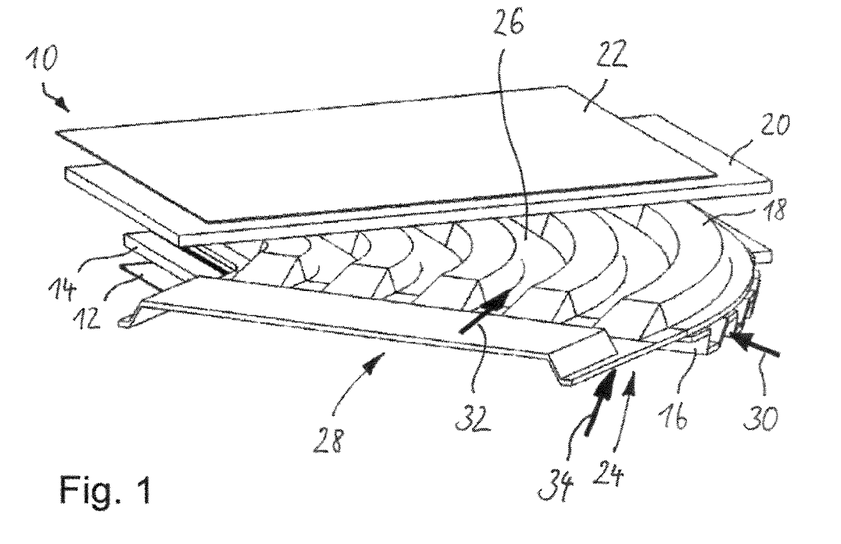
FIG. 1 shows a perspective sectional view of a surface layer of an anode-cathode stack of a fuel cell according to the prior art.

Illustrated in FIG. 1 is a surface layer 10 of an anode-cathode stack—not additionally illustrated—of a fuel cell for a motor vehicle, especially a hybrid motor vehicle, according to the prior art. In layers lying one on top of the other, the surface layer 10 comprises a lower membrane 12 as a "membrane electrode assembly", a lower gas diffusion layer 14, a lower bipolar plate 16, an upper bipolar plate 18, an upper gas diffusion layer 20 and an upper membrane 22. The membranes 12 and 22 and also the gas diffusion layers 14 and 20 extend in this case over an active surface, inside which the bipolar plates 16 and 18 form channel structures 24 each with a multiplicity of channels 26. Located in front of these channel structures 24 are feed structures 28 which are also formed by the bipolar plates 16 and 18. The feed structures 28 serve for distributing altogether three fluids, specifically gaseous hydrogen 30 ($H_2$), air 32 and also liquid coolant 34, into the channel structures 24.

Figure 2:
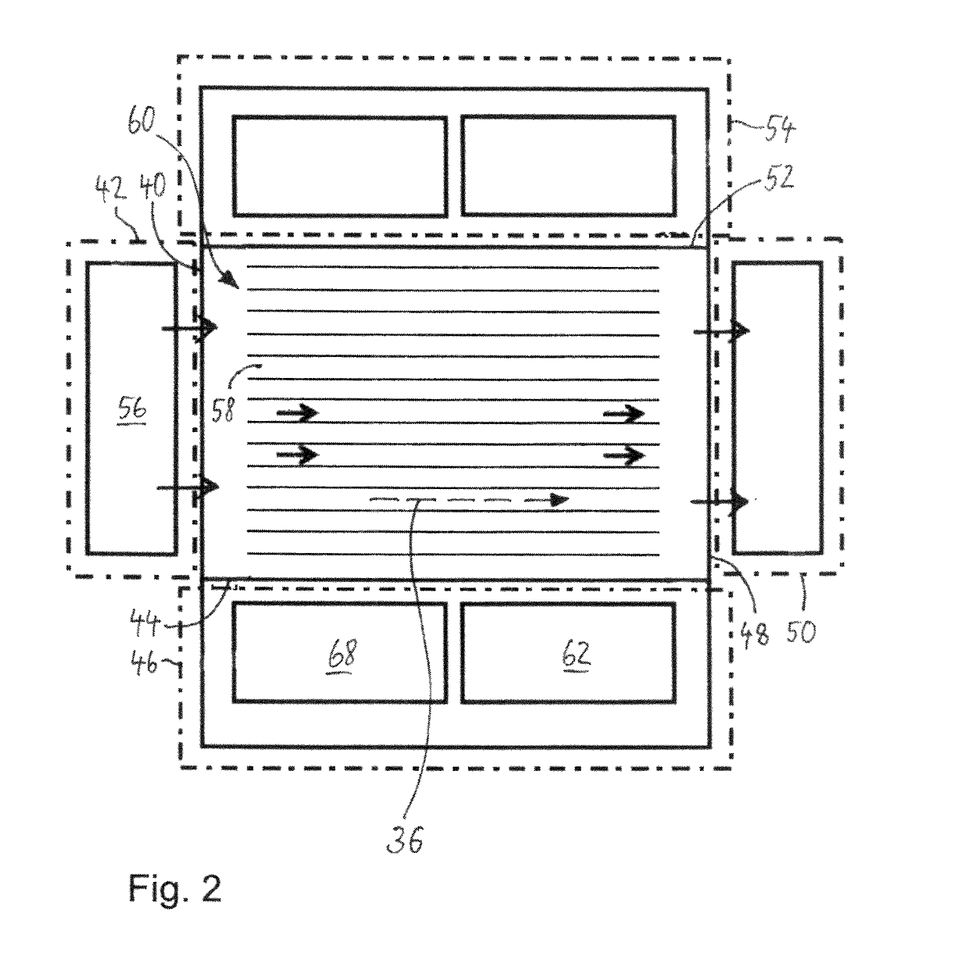
FIG. 2 shows a plan view of a first channel structure on a surface layer according to the prior art.
Figure 3:
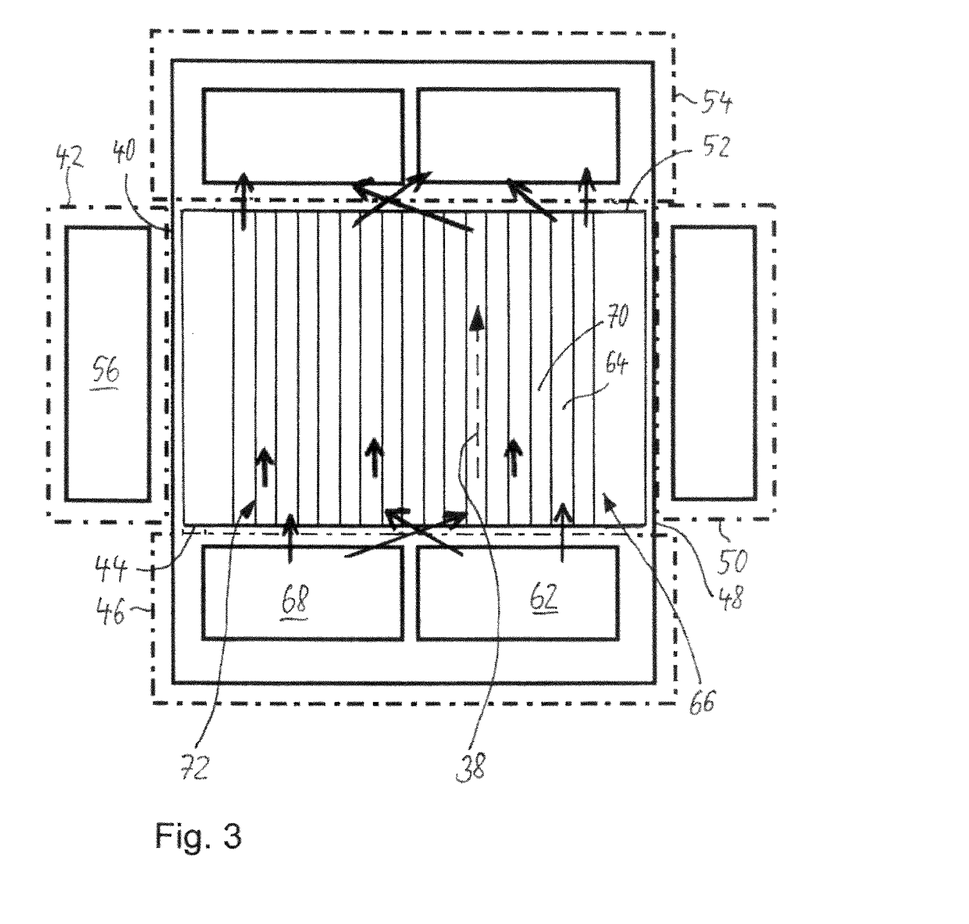
FIG. 3 shows a plan view of a second channel structure and a third channel structure on a surface layer according to the prior art.

During this distribution of the fluids 30, 32 and 34 there is the problem that the three fluids 30, 32 and 34 are to be introduced into the channel structures 24 from different sides so that flow passes through the channel structures 24 as a so-called cross-flow field in at least two directions 36 and 38 which are oriented transversely to each other (compare FIGS. 2 and 3). Accordingly, for the feed structure 28 according to the prior art, on an associated anode-cathode stack (not shown in more detail here) with a surface layer 10 which is rectangular in this case, a manifold 42 for feeding the fluid 30 has to be connected to an edge 40 and sealed there. Furthermore, a manifold 46 for feeding the fluid 32 and also the fluid 34 to the respective layer 10 has to be connected to an edge 44, oriented transversely to the edge 40, and sealed there. For discharging the fluids 30 or 32 and 34, a manifold 50 has to be provided on the opposite edge 48 and a manifold 54 provided on the edge 52 respectively. Altogether, therefore, at least four manifolds 42, 46, 50 and 54 are to be provided and sealed. Located then in the manifold 42 is a feed channel 56 for hydrogen which extends perpendicularly to the surface layer 10 and from which the hydrogen is conducted into channels 58 which are formed by a channel structure 60. The channels 58 extend in this case in the direction 36. In the same way, a feed channel 62 for air, which leads to channels 64 of a channel structure 66, and also a feed channel 68 for coolant, which leads to channels 70 of a channel structure 72, extend in the manifold 46. The channel structures 66 and 70 extend in this case in an intermeshed manner so that the channels 64 and 70 extend in parallel to each other in the direction 38 and therefore transversely to the direction 36.

Shown in FIGS. 4 to 7 are fuel cells 74 according to the invention which on their respective surface layer 76 have only two associated manifolds 78 and 80. The manifold 78 serves in this case for feeding both hydrogen and air and coolant into the surface layer 76. The manifold 80 serves for discharging these three media from the respective surface layer 76. The manifold 78 is located on a lower edge 82 of the surface layer 76—in this case rectangular—with regard to the figure and extends there over its entire longitudinal extent. The manifold 80 is located opposite on an upper edge 84. The manifold 76 is a component part of a feed structure 86 for hydrogen which is also designed with a feed channel 88 crossing the surface layer 76 perpendicularly and also with an edge channel 90. The edge channel 90 extends on the edge 92 which extends transversely to the edge 82 and 84 and is on the left with regard to the figure and leads into a multiplicity of channels 94. By means of these channels 94, the hydrogen which is fed in such a way is distributed uniformly over the surface layer 76. The channels 94 lead in this case into an edge channel 96 which is formed on the edge 98 of the surface layer 76 opposite the edge 92 across its entire length. The consumed hydrogen flows from the edge channel 96 into a discharge channel 100 formed on the manifold 80. The feed structure 86 therefore fed the hydrogen first of all perpendicularly to the surface layer 76 through the feed channel 88, then in the direction 38 through the edge channel 90, then in the direction 36 through the channels 94, then again in the direction 38 through the edge channel 96 and finally discharged the hydrogen perpendicularly to the surface layer 76 through the discharge channel 100.

Figure 5:
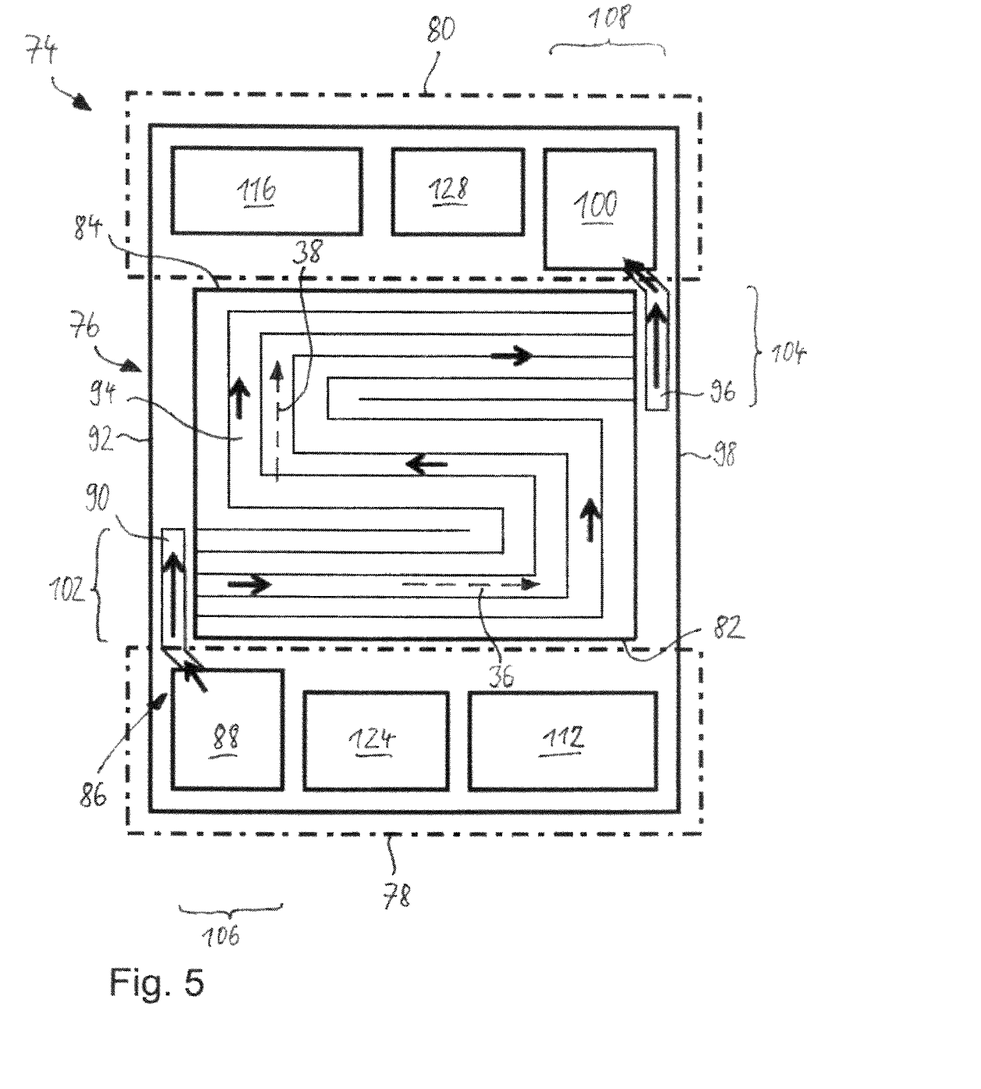
FIG. 5 shows a plan view according to FIG. 4 of a second exemplary embodiment according to the invention.

Illustrated in FIG. 5 is an exemplary embodiment of such a fuel cell 74 in which the edge channel 90 extends only over a part 102 of the entire length of the edge 92 and the edge channel 96 extends only over a part 104 of the entire length of the edge 98. In this case, the channels 94 are thus routed first of all in the direction 36, then in the direction 38, then opposite to the direction 36, then again in the direction 38 and then again in the direction 36 so that the hydrogen is conducted overall in an S-shaped manner over the surface layer 76.

Figure 4:
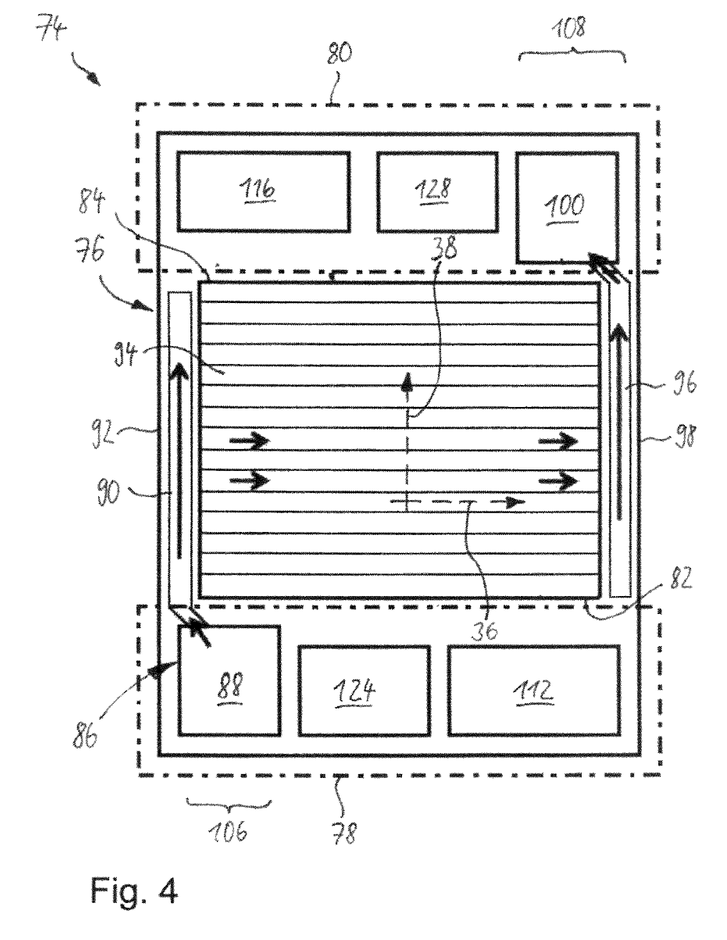
FIG. 4 shows a plan view of a first channel structure on a surface layer with an associated first feed structure and associated edge channels of a first exemplary embodiment according to the invention.

The associated feed channel 86 and discharge channel 100, connected to the edge channel 90 and to the edge channel 96 respectively, extend in this case in a left-hand corner region 106 of the manifold 78 and in a right-hand corner region 108 of the manifold 80 respectively with regard to FIGS. 4 and 5.

Figure 6:
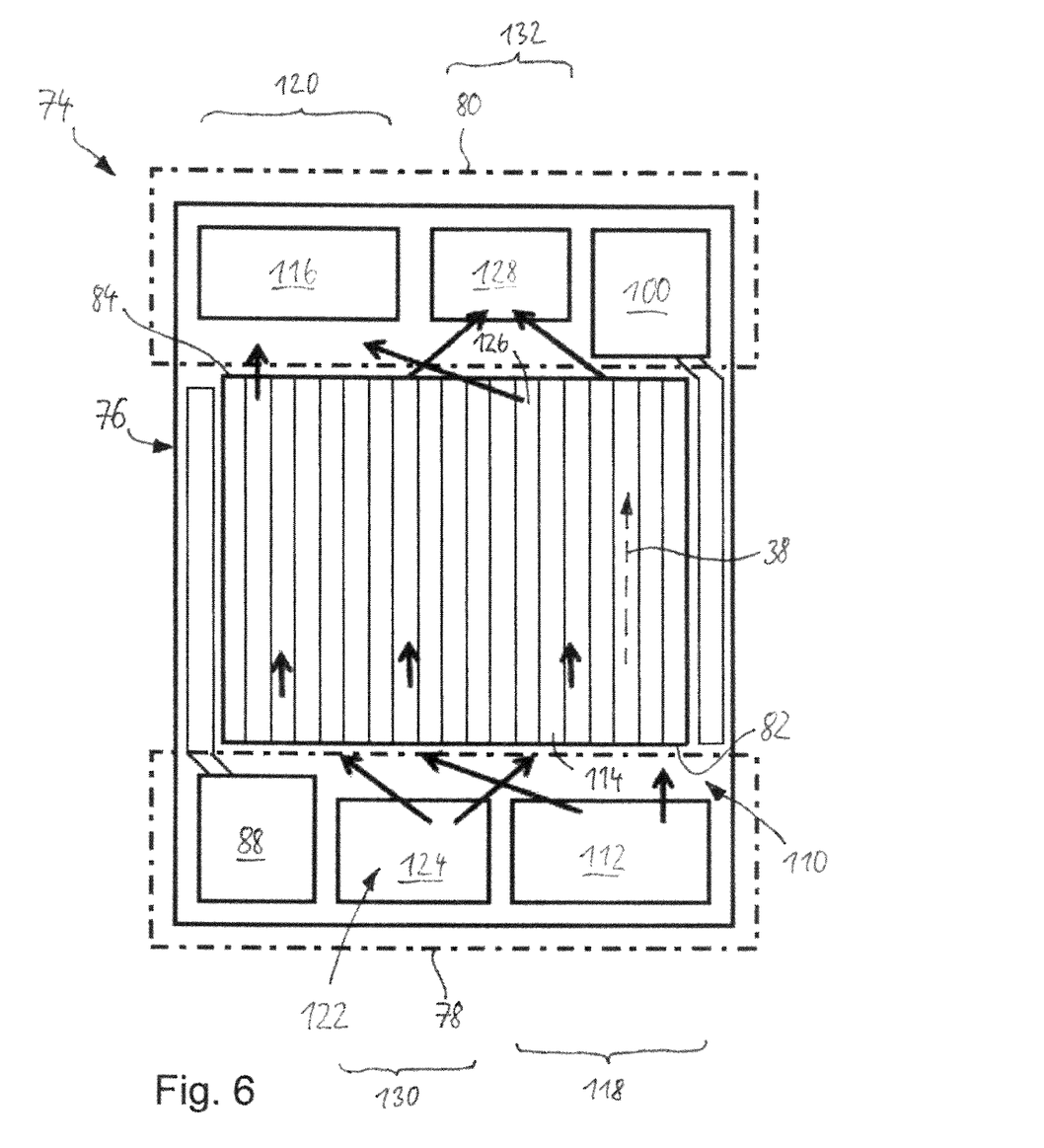
FIG. 6 shows a plan view of a second channel structure and a third channel structure on a surface layer with an associated second and third feed structure of the first exemplary embodiment according to FIG. 4.
Figure 7:
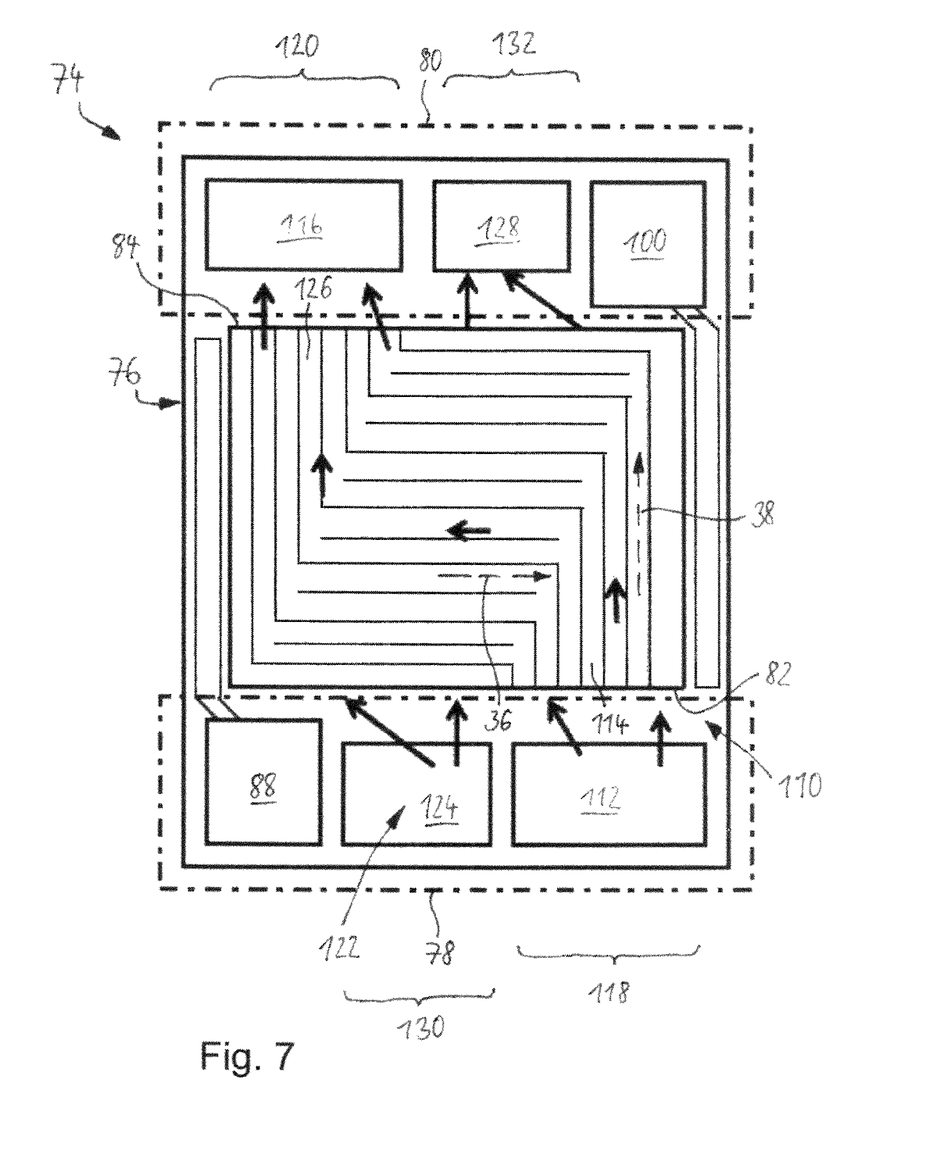
FIG. 7 shows a plan view according to FIG. 6 of the second exemplary embodiment according to FIG. 5.

Shown in FIGS. 6 and 7 is how in these two embodiments of the fuel cell 74 of FIGS. 4 and 5 the associated structures for the feed and discharge of air and coolant can be designed. In this case, a feed structure 110 for air together with its feed channel 112 are also arranged in the manifold 78. The feed channel 112 leads into a multiplicity of channels 114 by means of which the air is distributed across the surface layer 76 and is then conducted into a discharge channel 116 in the manifold 80. The feed channel 112 is located in this case in the right-hand corner region 118 of the manifold 78 and the discharge channel 116 is located in the left-hand region 120 of the manifold 80 with regard to FIGS. 6 and 7.

Furthermore, in the embodiments according to FIGS. 4 and 5 with the manifold 78, a part of a feed structure 122 is designed for coolant, in which a feed channel 124 for coolant leads into channels 126 which extend in each case in parallel next to the channels 114. By means of the channels 126, the coolant is then conducted over the surface layer 76 and distributed into a discharge channel 128 which is arranged in the manifold 80. The feed channel 124 for coolant and the discharge channel 128 for coolant extend in this case in a middle region 130 or 132 of the manifold 78 or 80 respectively.

FIG. 7 shows in this case an embodiment variant in which by means of the channels 114 and 126 the air or the coolant is conducted additionally in an S-shaped manner first of all in the direction 38, then opposite to the direction 36, and then again in the direction 38. By means of this diversion, the lengths of the flow paths produced in the individual channels 114 and 126 are largely equally long and therefore the flow resistances are kept largely at the same level.

LIST OF DESIGNATIONS

10 Surface layer of a fuel cell
12 Lower membrane
14 Lower gas diffusion layer
16 Lower bipolar plate according to the prior art
18 Upper bipolar plate according to the prior art
20 Upper gas diffusion layer
22 Upper membrane
24 Channel structure
26 Channel
28 Feed structure according to the prior art
30 Hydrogen as first fluid
32 Air as second fluid
34 Coolant as third fluid
36 Direction of the flow of hydrogen over the surface layer
38 Direction of the flow of air and coolant over the surface layer
40 Edge
42 Manifold
44 Edge
46 Manifold
48 Edge
50 Manifold
52 Edge
54 Manifold
56 Feed channel for hydrogen
58 Channel for hydrogen
60 Channel structure for hydrogen
62 Feed channel for air
64 Channel for air
66 Channel structure for air
68 Feed channel for coolant
70 Channel for coolant
72 Channel structure for coolant
74 Fuel cell according to the invention
76 Surface layer
78 Manifold
80 Manifold
82 Edge
84 Edge
86 Feed structure for hydrogen
88 Feed channel for hydrogen
90 Edge channel
92 Edge
94 Channel for hydrogen
96 Edge channel
98 Edge
100 Discharge channel for hydrogen
102 Part of the edge
104 Part of the edge
106 Corner region
108 Corner region 110 Feed structure for air
112 Feed channel for air
114 Channel for air
116 Discharge channel for air
118 Corner region
120 Corner region
122 Feed structure for coolant
124 Feed channel for coolant
126 Channel for coolant
128 Discharge channel for coolant
130 Middle region
132 Middle region The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell with an anode-cathode stack, the fuel cell comprising:
   an active surface layer;
   a first channel structure having a multiplicity of first channels for conducting a first fluid in a first direction over the active surface layer;
   a second channel structure having a multiplicity of second channels for conducting a second fluid in a second direction over the active surface layer, wherein the second direction extends in the main transversely to the first direction;
   a first feed structure for feeding the first fluid into the multiplicity of first channels; and
   a second feed structure for feeding the second fluid into the multiplicity of second channels,
   wherein the first feed structure and the second feed structure are both arranged on a first edge of the active surface layer and the first feed structure additionally has an edge channel for feeding the first fluid to a second edge of the active surface layer which is oriented transversely to the first edge, wherein the edge channel is interior to the second edge of the active surface layer, and whereby the first fluid enters the multiplicity of first channels only from the second edge via the edge channel.

2. The fuel cell as claimed in claim 1, wherein the active surface layer has a rectangular design, wherein the first edge is a first longitudinal side of this rectangular shape and the second edge is a second longitudinal side of the rectangular shape adjacent to the first longitudinal side.

3. The fuel cell as claimed in claim 1, wherein the edge channel for feeding the first fluid extends along the entire second edge of the active surface layer.

4. The fuel cell as claimed in claim 2, wherein the edge channel for feeding the first fluid extends along the entire second edge of the active surface layer.

5. The fuel cell as claimed in claim 3, in which, on a third edge of the active surface layer opposite the second edge, a further edge channel for discharging the first fluid from the multiplicity of first channels extends along the entire third edge of the active surface layer.

6. The fuel cell as claimed in claim 4, in which, on a third edge of the active surface layer opposite the second edge, a further edge channel for discharging the first fluid from the multiplicity of first channels extends along the entire third edge of the active surface layer.

7. The fuel cell as claimed in claim 1, wherein the edge channel for feeding the first fluid extends along only a part of the second edge, the first channels are designed to extend in an S-shaped manner in the active surface layer and on a third edge of the active surface layer opposite the second edge a further edge channel for discharging the first fluid from the multiplicity of first channels extends along only a part of the entire third edge.

8. The fuel cell as claimed in claim 2, wherein the edge channel for feeding the first fluid extends along only a part of the second edge, the first channels are designed to extend in an S-shaped manner in the active surface layer and on a third edge of the active surface layer opposite the second edge a further edge channel for discharging the first fluid from the multiplicity of first channels extends along only a part of the entire third edge.

9. The fuel cell as claimed in one of claim 1, wherein the first feed structure is designed with a first feed channel, extending perpendicularly to the active surface layer, for feeding the first fluid and is arranged on the first edge in its corner region to the second edge.

10. The fuel cell as claimed in one of claim 2, wherein the first feed structure is designed with a first feed channel, extending perpendicularly to the active surface layer, for feeding the first fluid and is arranged on the first edge in its corner region to the second edge.

11. The fuel cell as claimed in claim 1, wherein the second feed structure is designed with a second feed channel, extending perpendicularly to the active surface layer, for feeding the second fluid and is arranged on the first edge in its corner region facing away from the second edge.

12. The fuel cell as claimed in claim 2, wherein the second feed structure is designed with a second feed channel, extending perpendicularly to the active surface layer, for feeding the second fluid and is arranged on the first edge in its corner region facing away from the second edge.

13. The fuel cell as claimed in claim 1, further comprising:
   a third channel structure having a multiplicity of third channels for conducting a third fluid in a third direction over the active surface layer; and
   a third feed structure for feeding the third fluid into the multiplicity of third channels,
   wherein the third feed structure is also arranged on the first edge.

14. The fuel cell as claimed in claim 13, wherein the third feed structure is designed with a third feed channel, extending perpendicularly to the active surface layer, for feeding the third fluid and is arranged on the first edge in its middle region.

15. A motor vehicle having a fuel cell with an anode-cathode stack, the fuel cell comprising:
   an active surface layer;
   a first channel structure having a multiplicity of first channels for conducting a first fluid in a first direction over the active surface layer;
   a second channel structure having a multiplicity of second channels for conducting a second fluid in a second direction over the active surface layer, wherein the second direction extends in the main transversely to the first direction;
   a first feed structure for feeding the first fluid into the multiplicity of first channels; and
   a second feed structure for feeding the second fluid into the multiplicity of second channels,
   wherein the first feed structure and the second feed structure are both arranged on a first edge of the active surface layer and the first feed structure additionally has an edge channel for feeding the first fluid to a second edge of the active surface layer which is oriented transversely to the first edge, wherein the edge channel is interior to the second edge of the active surface layer, and whereby the first fluid enters the multiplicity of first channels only from the second edge via the edge channel.

16. The motor vehicle as claimed in claim 15, wherein the active surface layer of the fuel cell has a rectangular design, wherein the first edge is a first longitudinal side of this rectangular shape and the second edge is a second longitudinal side of the rectangular shape adjacent to the first longitudinal side.

* * * * *